(12) United States Patent
Sundman et al.

(10) Patent No.: US 11,412,542 B2
(45) Date of Patent: Aug. 9, 2022

(54) SCHEDULED TRANSMISSION

(71) Applicant: Telefonaktiebolaget LM Ericsson publ), Stockholm (SE)

(72) Inventors: Dennis Sundman, Sollentuna (SE); Luis Felipe Del Carpio Vega, Espoo (FI); Miguel Lopez, Solna (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 146 days.

(21) Appl. No.: 16/961,309

(22) PCT Filed: Jan. 12, 2018

(86) PCT No.: PCT/EP2018/050716
§ 371 (c)(1),
(2) Date: Jul. 10, 2020

(87) PCT Pub. No.: WO2019/137613
PCT Pub. Date: Jul. 18, 2019

(65) Prior Publication Data
US 2020/0344799 A1     Oct. 29, 2020

(51) Int. Cl.
*H04W 74/00* (2009.01)
*H04W 72/12* (2009.01)
(Continued)

(52) U.S. Cl.
CPC ..... *H04W 74/006* (2013.01); *H04W 72/1247* (2013.01); *H04W 72/1268* (2013.01);
(Continued)

(58) Field of Classification Search
None
See application file for complete search history.

(56) References Cited

U.S. PATENT DOCUMENTS

| 2006/0034216 A1* | 2/2006 | Kim | H04L 27/18 370/328 |
| 2012/0020336 A1* | 1/2012 | Bahr | H04W 74/02 370/336 |

(Continued)

FOREIGN PATENT DOCUMENTS

EP     2209346 A2     7/2010

OTHER PUBLICATIONS

International Search Report and Written Opinion of the International Searching Authority, PCT/EP2018/050716, dated Sep. 18, 2018, 13 pages.

(Continued)

*Primary Examiner* — Ajit Patel
*Assistant Examiner* — Pamit Kaur
(74) *Attorney, Agent, or Firm* — Sage Patent Group

(57) ABSTRACT

A method for operating an access point providing access to a wireless network for a plurality of wireless devices, wherein the wireless network includes at least one transmission channel with a sequence of transmission slots. The method includes assigning a first transmission slot to a first wireless device for a scheduled transmission with a priority access to the first transmission slot for the first wireless device, detecting during the first transmission slot that the first wireless device is currently not transmitting data in the assigned first transmission slot, and transmitting an indication to at least a subset of the plurality of wireless devices indicating that at least a time range in the first transmission slot until an end of the first transmission slot is available to the plurality of wireless devices for a data transmission using a random access procedure.

26 Claims, 8 Drawing Sheets

(51) Int. Cl.
  *H04W 74/08*   (2009.01)
  *H04W 88/08*   (2009.01)
(52) U.S. Cl.
  CPC ... *H04W 72/1289* (2013.01); *H04W 74/0833* (2013.01); *H04W 88/08* (2013.01)

(56) References Cited

U.S. PATENT DOCUMENTS

| | | | | |
|---|---|---|---|---|
| 2014/0140264 | A1* | 5/2014 | Lv | H04W 74/04 370/312 |
| 2015/0078215 | A1 | 3/2015 | Zhou et al. | |
| 2015/0092720 | A1 | 4/2015 | Grandhi et al. | |
| 2017/0325262 | A1* | 11/2017 | Tomeba | H04W 84/12 |
| 2017/0332395 | A1* | 11/2017 | Yin | H04W 72/1294 |

OTHER PUBLICATIONS

International Preliminary Report on Patentability of the International Preliminary Examining Authority, PCT/EP2018/050716, dated Dec. 16, 2019, 16 pages.

IEEE Standards Association, IEEE Standard for Information technology—Telecommunications and information exchange between systems, Local and metropolitan area networks, Specific Requirements—Part 11: Wireless LAN Medium Access Control (MAC) and Physical Layer (PHY) Specifications, IEEE Std—802.11-2016, 3534 pages.

Peón, Pablo Guitiérrez et al., "A Wireless MAC Method with Support for Heterogeneous Data Traffic," IECON2015, Yokohama, Japan, Nov. 9-12, 2015, 6 pages.

Costa, Robson, "Technical Report No. 1," Engineering Faculty, University of Porto (FEUP), Sep. 2010, 44 pages.

Bahr, Michael et al., "Shared Group Timeslots," IEEE P802.15 Working Group for Wireless Personal Area Networks (WPANs), IEEE 802.15-08/0827r0, Nov. 2008, 12 pages.

IEEE Standards Association, IEEE Standard for Information technology—Telecommunications and information exchange between systems, Local and metropolitan area networks, Specific Requirements—Part 11: Wireless LAN Medium Access Control (MAC) and Physical Layer (PHY) Specifications, IEEE Std—802.11-2016, p. 1295.

* cited by examiner

SCHEDULED TRANSMISSION

CROSS REFERENCE TO RELATED APPLICATIONS

This application is a 35 U.S.C. § 371 national stage application of PCT International Application No. PCT/EP2018/050716 filed on Jan. 12, 2018, the disclosure and content of which is incorporated by reference herein in its entirety.

TECHNICAL FIELD

The present application relates to a method for operating an access point providing access to a wireless network for a plurality of wireless devices and relates to the corresponding access point. Furthermore, a method for operating a first wireless device of a plurality of wireless devices is provided which accesses a transmission channel of the wireless network. Furthermore, the corresponding access point and first wireless device is provided and a system comprising the access point and the first wireless device. Additionally, a computer program comprising program code and a carrier comprising the computer program is provided.

BACKGROUND

IEEE 802.11, also known as WLAN or Wi-Fi, is a wireless technology for operating ISM (Industrial, Scientific, Medical) bands. The most common mode of operation is contention-based on the CSMA/CA (Carrier Sense Multiple Access/Collision Avoidance). Another known mode of operation is the Point Coordination Function (PCF) where a contention-free period and a contention-based period exist. In the contention-free period the Access Point (AP) polls STAs (Stations), also called wireless devices hereinafter, for transmissions and in the contention-based period CSMA/CA is used. The PCF offers centralized control, however it does not provide deterministic time because before the contention-free period starts, a beacon frame is transmitted after a CCA (Clear Channel Assessment) procedure.

Based on the PCF mode, deterministic Wi-Fi solutions are proposed based on Time Division Multiple Access (TDMA) scheme where the time is divided in time slots. In these systems, as shown in FIG. 1, wireless devices are centrally scheduled into specific time slots 11, scheduled time slots, but there are also time slots 12 that allow for channel contention. This provides deterministic access times for real-time traffic and non-deterministic traffic, for example for best-effort traffic.

Real-time operating systems have been available for a long time. In many cases where real-time requirements are present, these systems are however not used. The reason is that although the real-time operation guarantees a certain response and reliability, it is wasteful in terms of resources.

Ultra Reliable Low Latency Communications (URLLC) and critical Machine Type Communications (MTC) typically require very low latencies. The actual requirements vary depending on the use case. For example, one-way radio access network latencies in the order of 0.5 ms to 5 ms are commonly needed in use cases targeting indoor industrial applications. Many URLLC applications are based on periodic sampling from sensors and actuators. Therefore, deterministic scheduling is a good and preferred operation mode for these devices. Such traffic is referred to as critical traffic or traffic with a scheduled transmission. Non-critical traffic is data communication without critical requirements, for example regular Wi-Fi traffic.

FIG. 2 illustrates a generic example of the radio resource partitioning in frequency and time. The terms of C-channel (Critical channel) 21 and N-channel (Non-critical channel) 22 represent the radio resources allocated to serve the critical and non-critical traffic, respectively. The frequency band hosting the C-channel is called C-band (Critical band) 20. There is at least one C-band 20 in an URLLC system and the AP (Access Point) should support it. The C-band 20 consists of consecutive scheduling periods each of which is divided into a C-channel period (t_critical) and a N-channel period (t_period−t_critical). In the following only the case is considered when there is just one band and this band contains both the C-channel and the N-channel. The MAC (Medium Access Control) protocol operating in the N-channel 31 of the N-band 30 is fully compatible to the current WLAN standards.

In a deterministic system, there is in practice an inherit problem with total system capacity. The reason is that each user must be assigned a time slot larger than what is needed in practice. Put in other words, a user may be finished with its time slot earlier than scheduled. Examples of reasons thereof are:

To ensure transmission reliability, the time slot may be selected such that in case of a failed transmission, there is time for a re-transmission. Then, in most cases, less than half of the time slot will be used.

A time slot must typically be assigned assuming a lowest modulation and coding scheme (MCS). In practice, the channel may be good and a higher MCS can be used.

A time slot must be large enough for some maximum data size. Sometimes, the amount of data that needs to be sent is smaller than this maximum size.

Sometimes an assigned user may not have any data to transmit at all.

When the wireless device reports some value, and this value has not been changed since the last transmission, no update is sent.

Another reason can be that the device has broken and is therefore not transmitting. In this case, the device's resources are wasted until a re-scheduling is performed.

Accordingly, a need exists to avoid at least some of the above-mentioned problems and to increase the transmission capacity in a system which uses at least a transmission channel with a scheduled transmission with a priority access for one wireless device among a plurality of wireless devices.

SUMMARY

This need is met by the features of the independent claims. Further aspects are described the dependent claims.

According to a first aspect a method for operating an access point providing access to a wireless network for a plurality of wireless devices is provided wherein the wireless network comprises at least one transmission channel with a sequence of transmission slots. According to the method a first transmission slot of the sequence of transmission slots is assigned to a first wireless device of the plurality of wireless devices for a scheduled transmission with a priority access to the first transmission slot for the first wireless device. It is detected during the first transmission slot that the first wireless device is currently not transmitting data in the assigned first transmission slot and an indication is transmitted to at least a subset of the plurality of wireless devices indicating that at least a time range in the first transmission slot until the end of the first transmission slot is available to the plurality of wireless devices for a data transmission using a random access procedure.

Furthermore, the corresponding access point is provided providing the access to the wireless network wherein the access point comprises a memory and at least one processing unit and wherein the memory contains instructions executable by the at least one processing unit. The access point is operative to work as discussed above or as mentioned in further detail below.

With the above discussed method the access point can change the transmission operating mode in the first transmission slot for which a scheduled transmission is used to another operating mode in which the plurality of wireless devices or a subset thereof can use the remaining of the first transmission slot for accessing the transmission channel using a random access procedure. In other words, based on the wording used in the introductory part, the operating mode is changed by the access point from the critical mode where a scheduled transmission is used to the non-critical mode where a random access procedure or contention-based access is used.

Accordingly, the transmission capacity can be increased as data can be transmitted in a time slot which was assigned to one of the wireless devices, but which can then be used also by other wireless devices in response to the received indication transmitted by the access point. A higher flexibility is obtained for the access point which can react to the present transmission needs of the wireless devices.

As an alternative, an access point configured to provide access to a wireless network is provided for a plurality of wireless devices, wherein the wireless network comprises at least one transmission channel with a sequence of transmission slots. The access points comprises a first module configured to assign a first transmission slot of the sequence of transmission slots to a first wireless device of the plurality of wireless devices for a scheduled transmission with a priority access to the first transmission slot for the first wireless device. The access point comprises a second module configured to detect during the first transmission slot that the first wireless device is currently not transmitting data in the assigned first transmission slot. A third module is provided configured to transmit an indication to at least a subset of the plurality of wireless devices indicating that at least a time range in the first transmission slot after transmitting the indication to the end of the first transmission slot is available to the plurality of wireless devices for a data transmission using the random access procedure.

Furthermore, a method for operating a second wireless device of the plurality of wireless devices is provided which accesses the transmission channel of the wireless network in which a first transmission slot of the transmission channel is assigned to a first of the plurality of wireless devices for a scheduled transmission with a priority access. The second wireless device receives an indication from an access point of the wireless network during the first transmission slot that at least a time range in the first transmission slot until the end of the first transmission slot is available for a data transmission using a random access procedure. The second wireless device starts to access the transmission channel within the first transmission slot using the random access procedure in response to the received indication.

Furthermore, the corresponding second wireless device of the plurality of wireless devices is provided which accesses a transmission channel of a wireless network in which a first transmission slot of the transmission channel is assigned to a first of the plurality of wireless devices for a scheduled transmission with a priority access wherein the second wireless device comprises a memory and at least one processing unit wherein the memory contains instructions executable by said at least one processing unit and the first wireless device is operative to work as mentioned above or as discussed in further detail below.

The second wireless device can react to the received indication and can start accessing the time slot which was scheduled for another wireless device, the first wireless device.

As an alternative, a second wireless device of a plurality of wireless devices is provided which accesses a transmission channel of a wireless network in which a first transmission slot of the transmission channel is assigned to a first of the plurality of wireless devices for a scheduled transmission with a priority access to the first wireless device. The second wireless device comprises a first module configured to receive an indication from an access point of the wireless network during the first transmission slot which indicates that at least time range in the first transmission slot until the end of the first transmission slot is available for data transmission using a random access procedure. The second wireless device comprises a second module configured to start to access the transmission channel within the first transmission slot using a random access procedure in response to the received indication.

Additionally, a system comprising the access point and the second wireless device is provided and a computer program comprising a program code to be executed by at least one processing unit of the access point or of the second wireless device. Execution of the program code causes the at least one processing unit to execute a method as mentioned above or as discussed in further detail below.

Additionally, a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated but also in other combinations or in isolation without departing from the scope of the present invention which is defined by the annexed claims. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
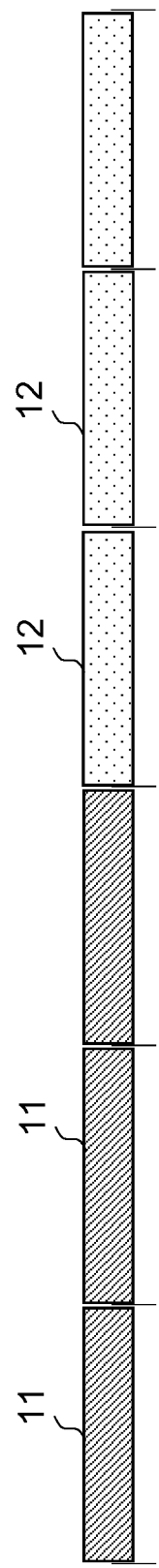
FIG. 1 schematically shows an example of a transmission channel of a wireless network comprising scheduled transmission slots in which a scheduled transmission with a priority access is used and with random access transmission slots in which a random access procedure is used for a data transmission as known in the art.

In the following embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only. The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the following it will be described in further detail how an access point can change a medium access configuration of wireless devices from a scheduled transmission with a priority access to a transmission using a random access procedure in which different wireless devices compete for the available capacity based on an indication transmitted by the access point. This indication can change the state from a critical mode in which a scheduled transmission is used to the non-critical mode in which a defined low latency cannot be guaranteed as a random access procedure is used to access the transmission channel.

Figure 2:
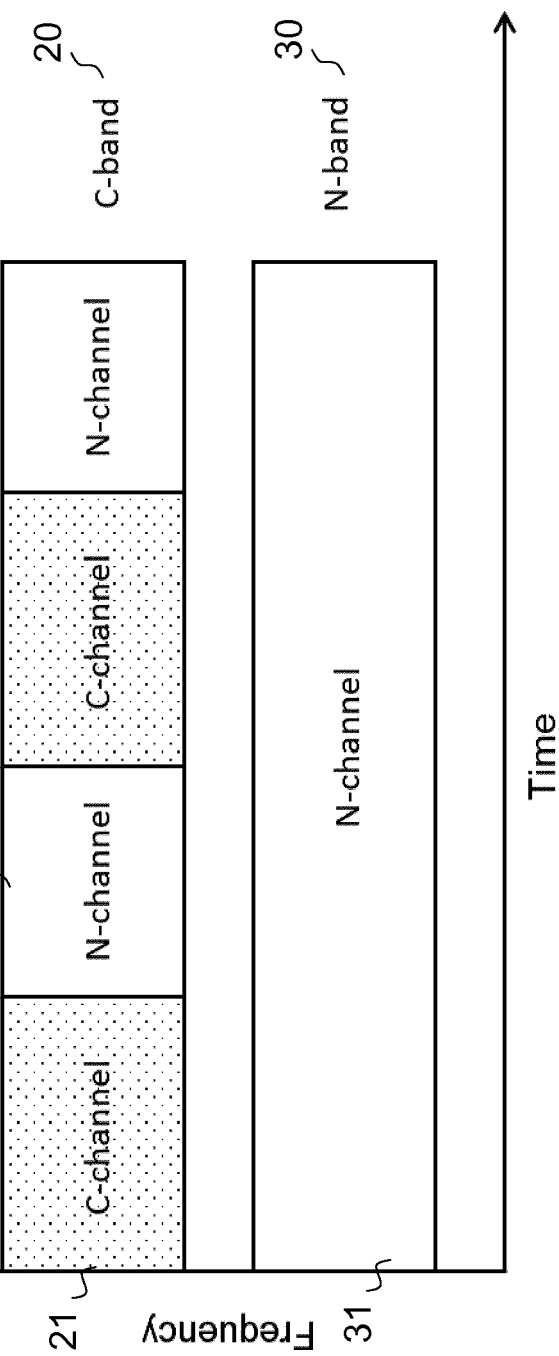
FIG. 2 shows an example schematic view of a radio resource partition comprising different bands and at least one band in which a scheduled transmission and a random access procedure is used for the data transmission as known in the art.
Figure 3:
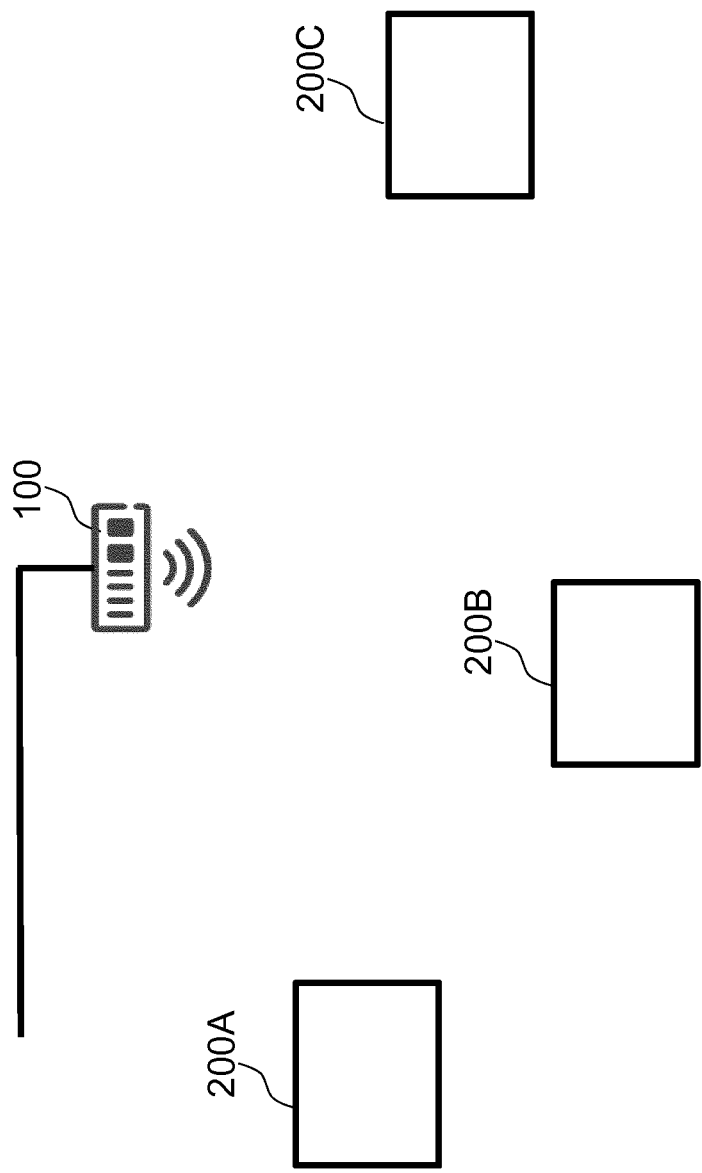
FIG. 3 shows an example schematic architectural view of a system comprising an access point and several wireless devices which communicate with the access point or a wireless network wherein the access point and the wireless devices are configured for increased transmission capacity incorporating features of the invention.

FIG. 3 shows a schematic architectural view in which an access point 100 provides access to a wireless network in which several wireless devices 200 such as devices 200A, 200B, or 200C transmit data to the access point 100 or receive data from the access point 100. The wireless network used for the communication between the access point 100 and the wireless devices 200 comprises at least one transmission channel which uses at least a scheduled mode with a scheduled transmission in which one of the wireless devices has a priority access to certain time slots. These transmission time slots in which one wireless device has the priority to use the corresponding time slot are also called deterministic time slots. Furthermore, the wireless network can comprise random access transmission slots where a contention between the different wireless devices is carried out for using a corresponding transmission slot. As a consequence these time slots, the random access transmission slots are also called contention time slots. The transmission channel can be designed as shown in FIG. 1 or 2. When a channel is in a contention mode, in the random access transmission slots, any wireless device may contend for the channel using traditional contention-based channel access like CSMA/CA. When the channel is in the deterministic mode with a scheduled transmission a single wireless device or group of wireless devices are scheduled to get a priority access to the channel.

As discussed above, the capability is added to switch from the contention operating mode to the deterministic operating mode dynamically. By way of example wireless device 200A of FIG. 3 is scheduled for access in the deterministic operation mode in which the wireless device is scheduled for transmission and has a priority access to the transmission channel. However, if the wireless device 200A does not utilize the channel within a certain time, a predefined time range $T_{CD}$ (contention deadline) the access point 100 broadcasts a message to change the state of the channel from the scheduled transmission with priority access to the contention mode in which a random access procedure is used to access the channel.

Figure 4:
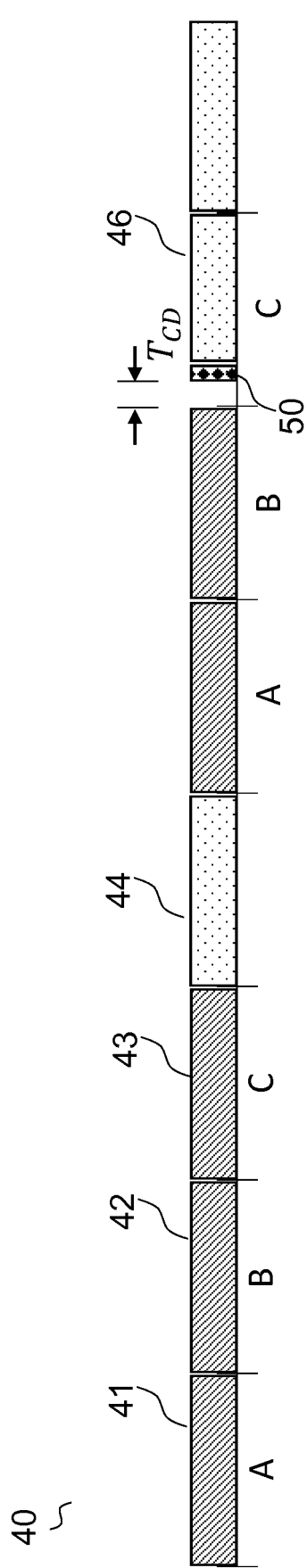
FIG. 4 shows an example schematic representation of a transmission channel in which the access point informs the wireless devices with an indication that a transmission slot which was assigned to one of the wireless devices for a scheduled transmission is now available to other wireless devices with a random access procedure.

FIG. 4 describes a first example in which one of the wireless devices such as wireless device 200C shown in FIG. 3 has nothing to transmit in a timeslot for which it has priority access. FIG. 4 shows a transmission channel with a time slot 41 in which the wireless device 200A is scheduled for transmission and has a priority access to the transmission channel 40. In the same way a transmission slot 42 is provided in which the wireless device 200B has a priority access to the channel. In the same way transmission slot 43 is provided in which the wireless device 200C has a priority access and is scheduled for transmission. In time slot 44 a contention-based access is provided in which all devices can transmit data based on a random access procedure.

In the example shown the wireless device 200C has nothing to transmit in the transmission slot 46. This is detected by the access point within a predefined time range, $T_{CD}$, as explained in further detail in connection with FIG. 7. As a consequence, a message is transmitted to all, or at least a sub-set of the wireless devices, i.e., the indication 50, which indicates that the that the operating mode of the access point and the wireless devices change to the non-critical mode, so that all wireless devices can access the time slot 46 based on a random access procedure.

The message or indication 50 can be transmitted to all wireless devices connected to the access point 100, however the access point can also transmit the indication to only a subset of the wireless devices 200. The subset of wireless devices may be a group of devices having a second highest priority (e.g. devices 200B and 200C out of several other devices) or may be any other group defined by a predetermined criterion. The priority level of the wireless devices may be known to the access point so that the indication is only transmitted to the subset of wireless devices (e.g. in a unicast message). Furthermore a subset identifier may be added to the indication by the access point and the wireless devices belonging to the subset may determine that they are the intended recipient of the indication by identifying themselves based on the subset identifier present the received indication which in this case can be a broadcast message. If a member of the subset is still not transmitting in the timeslot, the indication may be transmitted to all of the plurality of wireless devices, if time allows or if necessary.

Figure 5:
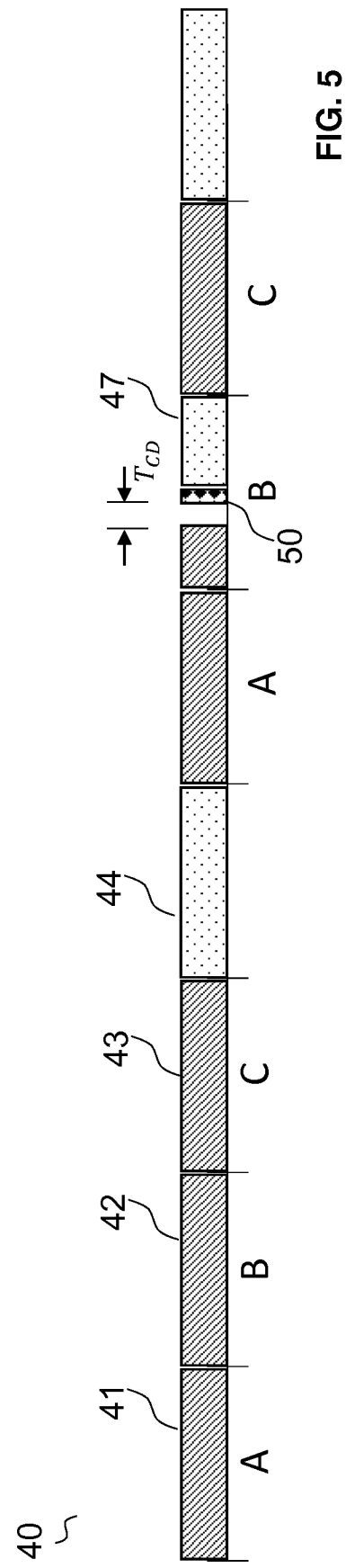
FIG. 5 shows another example schematic representation of the transmission channel in which a transmission slot is not completely used by the wireless device having priority access and in which the other wireless devices are informed by an indication that they can access the corresponding transmission slot with a random access procedure.

FIG. 5 shows another example of the transmission channel 40 wherein the transmission slots 41 to 44 correspond to the corresponding slots 41 to 44 discussed above in connection with FIG. 4. In the example shown in FIG. 5 the transmission by the wireless device 200B finishes before the time slot 47 is over. This may happen, for example, when the wireless device 200B, or the wireless devices in a larger group of wireless devices, require less airtime than predicted. In this scenario the indication 50 is sent which can be the CF-End frame. Another example is when the wireless device 200B has a time slot with long enough room to support a possible retransmission of the transmitted data. In this last case an acknowledgement may serve as the indication for the channel switch if the system is configured in such a way.

Figure 6:
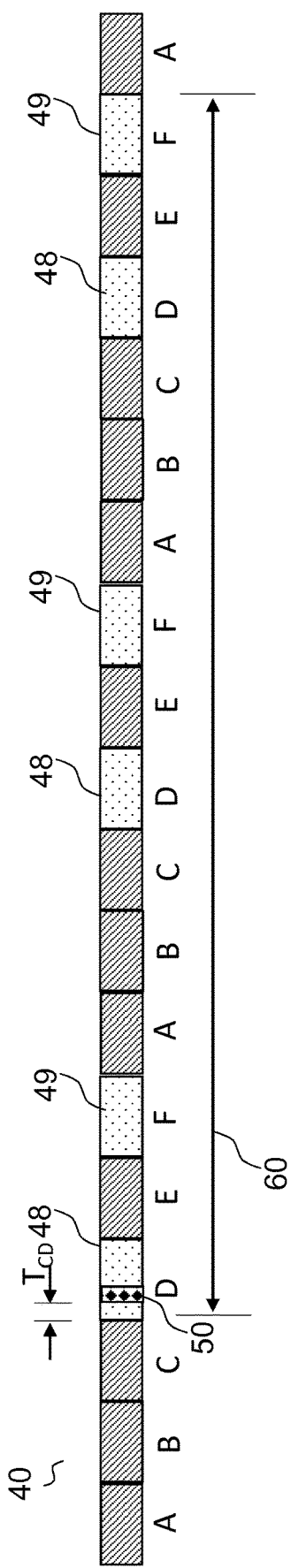
FIG. 6 shows a further example schematic representation of a transmission channel, as shown in FIGS. 4 and 5, in which an indication indicating the availability of a transmission slot also comprises information about future slots.

FIG. 6 describes an example where the access point has knowledge about the availability of other wireless devices or group of wireless devices in the future. In this case the indication, by way of example the P_switch packet, may contain this information. As shown in FIG. 6 a wireless device or several devices may not be available, e.g. for maintenance reasons so that all the time slots assigned to the wireless devices would be available for other wireless devices. Accordingly, when the access point 100 has knowledge of the future availability of this time slot assigned to one of the wireless devices, the access point can announce the availability of the corresponding time slots in the future for random access procedure. As the duration of each time slot may be comparatively short in a deterministic Wi-Fi system, such an approach can reduce the relative overhead caused by the transmission of the indication. By way of example if the access point knows that the time slots 48 and 49 will be free, the access point can indicate in the indication 50 that the corresponding slots are free for random access for the next number of n-cycles on a defined time range 60 such as for example y ms. Any wireless device that wins the random access obtains the channel access for one, several or all of the slots 48 and 49 within the time range 60. The time slots 48 and 49 may have been assigned to a single or different wireless devices with priority access.

Figure 7:
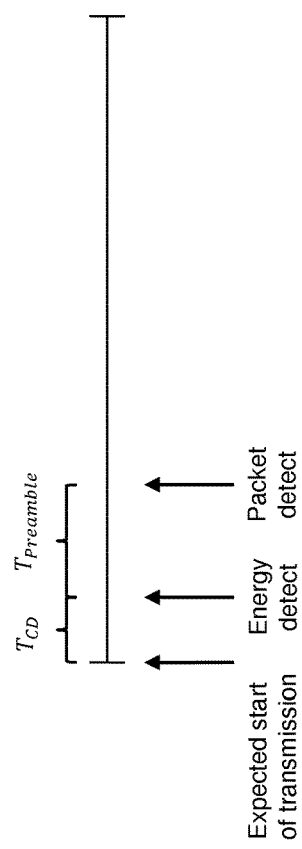
FIG. 7 shows an example schematic view of a timing used by the access point to determine whether a wireless device having a priority access transmits in the scheduled transmission slot or not.

FIG. 7 summarizes how the access point can determine whether the wireless device to which one time slot is assigned for a priority access does actually transmit data or not. The time line starts at the expected start of transmission and in the predefined time range $T_{CD}$ the access point can detect whether an energy, for example whether the detected signal has a certain energy, is actually transmitted in the assigned time slot. If the presence of a data packet is used for determining a transmission of the device having priority access, a further time, $T_{preamble}$, passes in which the access point detects the signal field present in the data packet. The transmission by the priority wireless device can also be detected only based on the packet detection after the time $T_{CD}$ and after $T_{preamble}$.

Figure 9:
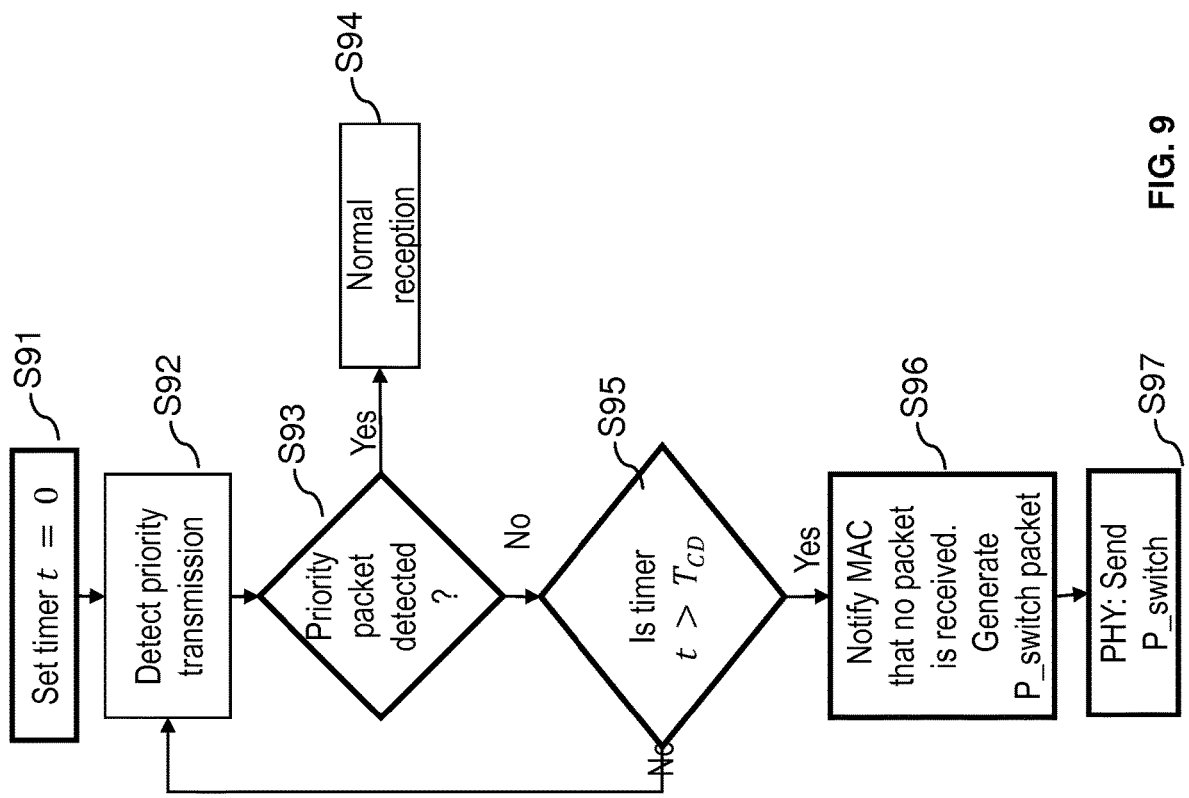
FIG. 9 shows an example flowchart of a method carried out by the access point transmitting the indication to the plurality of wireless devices that the corresponding transmission slot is available to other wireless devices for a random access procedure.

FIG. 9 summarizes the steps carried out by the access point for determining whether a wireless device having priority access to a transmission slot actually uses the transmission slot, and if this is not the case to allow other wireless devices to use the reserved transmission slot for transmission. In step S91 the access point sets a timer at the expected start of transmission, by way of example at the beginning of the transmission slot. In step S92 it is checked whether a transmission of data of the wireless device having priority access to the corresponding transmission slot is detected. Step S92 can be carried out by detecting any energy present in the corresponding time slot. In step S93 it is then checked whether a data packet can be detected from the wireless device having priority access to the time slot. If the packet is detected as belonging to the wireless device for which the transmission slot has been reserved, it is concluded that the wireless device having priority access to the transmission slot is actually transmitting data. However as mentioned above it is also possible to only use the packet detection alone without the energy detection. The packet detection is possible by a complete decoding of the corresponding signal field in the data packet. When no data packet is detected it is checked in step S95 whether the timer has passed the predefined time range $T_{CD}$. If not the access point waits until this time range has elapsed and checks whether a priority packet can be detected. When the timer has passed the predefined time range either $t > T_{CD}$ or $t > T_{CD} + T_{preamble}$ the access point concludes that the wireless device with priority access is not using the corresponding time slot. Accordingly, it notifies the MAC layer that no packet is received and that the indication 50 should be generated by which the wireless devices are informed that they may now use the corresponding time slot. In the example shown in step 96 the indication is a P_switch packet. In step S97 the corresponding notification is then sent by the physical layer.

In general the indication may be transmitted when no data is detected from the device with priority access. It is also possible that the wireless device 200A utilizes the assigned transmission slot, but there is time left in the transmission slot after $T_{CD}$ of the last transmission. In this example the access point 100 may also broadcast the indication to change the state of the channel from the deterministic mode with the scheduled transmission to the contention mode.

The wireless device which has priority access to the corresponding time slot can be a single wireless device, or may be a group of wireless devices.

There are different options for the access point to determine that the wireless device which has priority access is not using the assigned transmission slot. One possibility for this detection that the transmission channel is not used in the assigned time slot can be an energy detection carried out by the access point 100 in which it is checked whether a certain energy level is detected in the assigned transmission slot. If a certain signal level or energy is not detected, the access point can deduce that the corresponding wireless device with the priority access will not use the assigned transmission slot. A different or additional possibility to detect that the wireless device with the priority access does not use the assigned transmission slot is the use of packet detection in which the received signal is processed by the access point and it is checked whether the presence of the data packet can be identified. This may be obtained when the signal field in the corresponding data packet is correctly decoded.

The predefined time range which is used by the access point to determine whether the wireless device with the priority access actually uses the assigned transmission slot may be a priority interframe spacing, PIFS.

Figure 8:
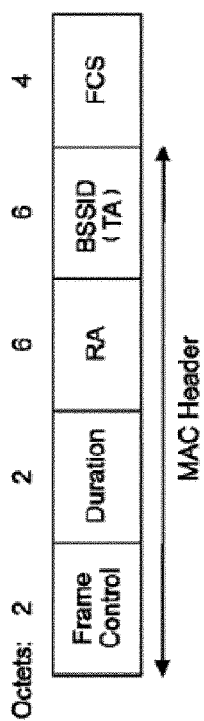
FIG. 8 shows a schematic view of a composition of an indication by which the access point indicates that at least a part of a transmission slot which was assigned to one of the wireless devices is available for other wireless devices based on the random access procedure.

The indication transmitted to the plurality of wireless devices can be a broadcast message transmitted by the access point, e.g., a contention-free end frame, CF-End frame. An example of this end frame is shown in FIG. 8. Such an CF-End frame is transmitted by the access point 100 as indication that all wireless devices or a subset thereof can now contend for the transmission slot. As indicated above the indication can furthermore comprise a subset identifier by which a subset of the wireless devices connected to the access point can be addressed.

As an alternative, the indication may also be implemented as a broadcast message as an acknowledgement frame transmitted by the access point 100.

As discussed in connection with FIG. 6 the broadcast indication can also contain information about the availability of future time slots.

The wireless devices which are in communication with the access point and which are associated with the access point and which have received the indication 50, can start channel contention and transmit if the channel is idle and the transmission time of the packet fits to the time allowed for the contention mode. The time allowed for the contention mode is at least the remaining time of the corresponding time slot which was originally assigned to one of the wireless devices for a priority access.

The time allowed for the contention mode based on the transmitted indication can also comprise several time slots if the indication has signaled them for the contention modules. Those several time slots may be consecutive or non-consecutive.

Figure 10:
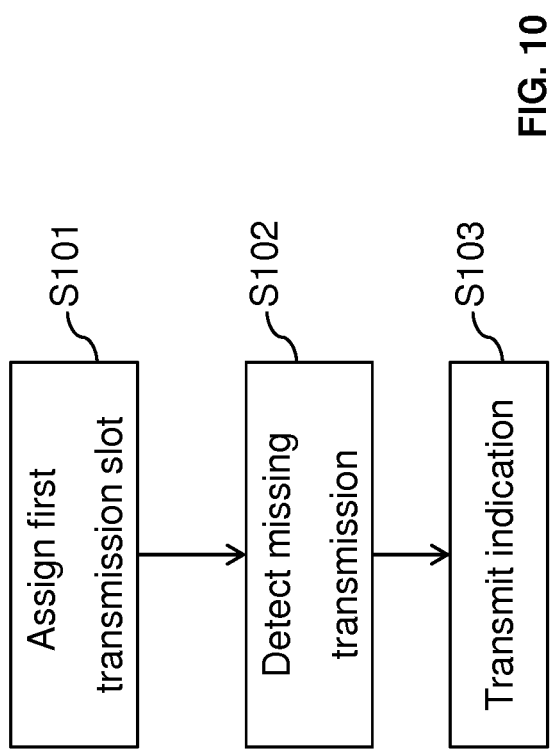
FIG. 10 shows a further example flowchart of a method carried out by an access point providing access to a wireless network and which transmits the indication to the plurality of wireless devices.

FIG. 10 further summarizes the steps carried out at the access node 100. In a first step a transmission slot is assigned as a priority transmission slot to a certain wireless device, here a first transmission slot to a first wireless device of the several wireless devices. In step S102 the access node then detects during the first transmission slot that the first wireless device to which the slot was assigned does not transmit data in the slot or that the data transmission is already completed. As discussed above in connection with FIG. 4, the first wireless device may not transmit any data in the assigned transmission slot whereas in FIG. 5 the transmission may be completed so that the rest of the transmission slot is available for other transmissions. In response to the fact that a transmission slot is not completely used by the wireless device which has priority access the access point 100 generates and transmits the indication 50 to at least a sub-set of the wireless devices attached to the access point that at least until the end of the corresponding transmission slot the slot is available for data transmission using a contention process such as random access procedure. As indicated in FIG. 6, the indication may also contain information about other future transmission slots (either consecutive or non-consecutive slots). However, at least the information is provided that the slot is available until the end of the transmission slot for at least a sub-set of the wireless devices for transmission.

Figure 11:
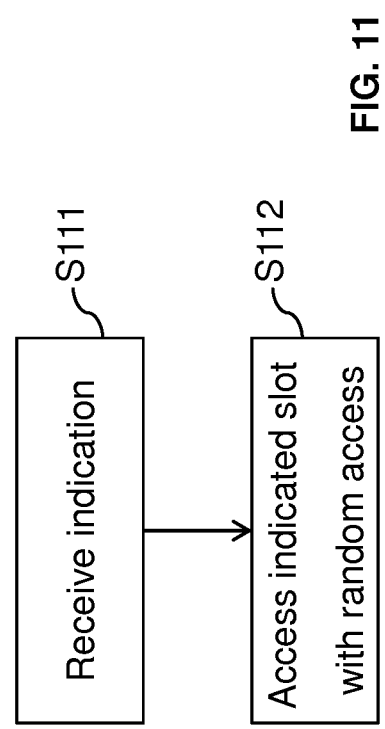
FIG. 11 shows an example flowchart of a method carried out at a wireless device receiving the indication sent by the access point.

FIG. 11 summarizes the steps carried out at one of the wireless devices which is not the wireless device to which the (priority) transmission slot has been assigned. Accordingly, in the embodiment of FIG. 11 a wireless device receives the indication that a transmission slot or the rest of the transmission slot would be available fora contention-based transmission. Based on the received indication the wireless device accesses the slot with the random access procedure. In this random access procedure the corresponding wireless device checks whether there is data transmission in the corresponding slot from other wireless devices and if no signal is detected it sends a random access request requesting the use of the corresponding time slot.

Figure 12:
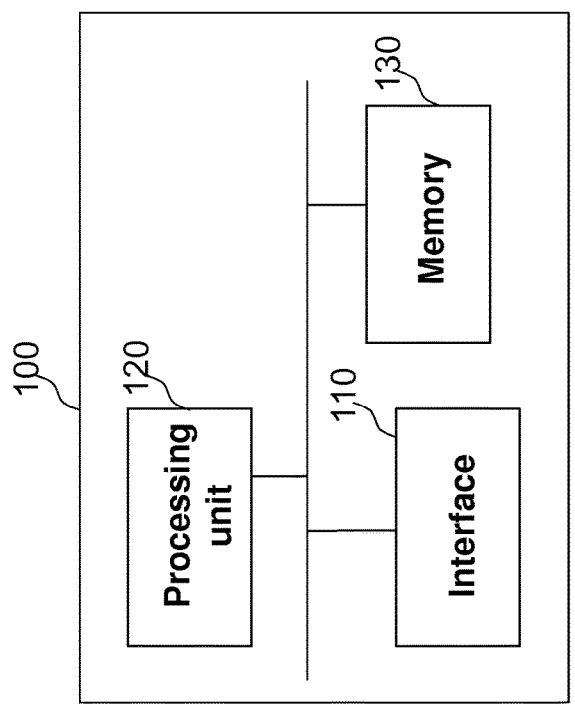
FIG. 12 shows an example schematic representation of an access point providing access to a wireless network incorporating features of the invention.

FIG. 12 shows a schematic architectural view of an access point 100 which can operate as discussed above. The access point comprises an interface 110 which is provided for transmitting user data or control messages to other entities such as the wireless devices and which is provided for receiving user data or control messages from other devices such as the wireless devices. The interface 110 is especially qualified to transmit the indication to the wireless devices 200 that at least the rest of the transmission slot is available for contention-based access even though the corresponding transmission slot was originally assigned to one of the wireless devices with a priority access. The access point 100 furthermore comprises a processing unit 120 which is responsible for the operation of the access point 100. The processing unit 120 comprises one or more processors and can carry out instructions stored on a memory 130, wherein the memory may include a read-only memory, a random access memory, a mass storage, a hard disk, or the like. The memory can furthermore include a suitable program code to be executed by the processing unit 120 so as to implement the above described functionalities in which the access node is involved.

Figure 13:
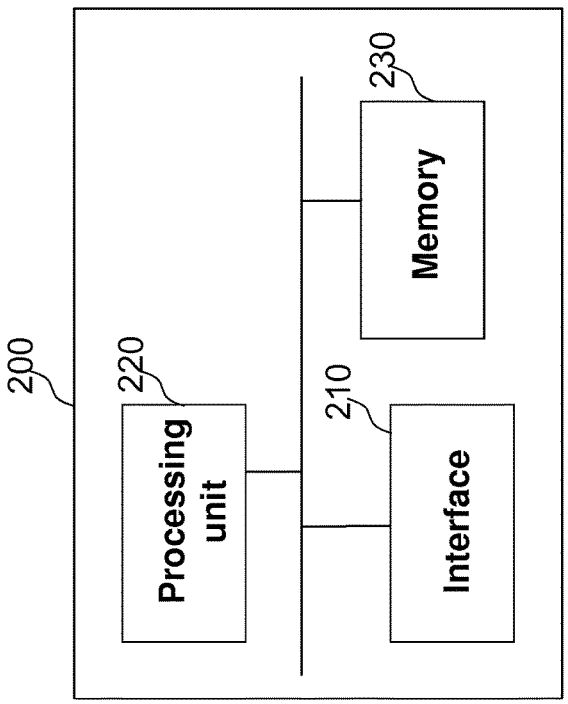
FIG. 13 shows an example schematic representation of a wireless device receiving the indication and incorporating features of the invention.

FIG. 13 shows a schematic architectural view of a wireless device 200 which receives the indication transmitted by the access point. The wireless device 200 comprises an interface 210 for transmitting user data or control messages to other entities and for receiving user data and control messages from other entities, such as the indication transmitted by the access point 100. The wireless device 200 furthermore comprises a processing unit 220 which is responsible for the operation of the wireless device 200. The processing unit 220 comprises one or more processors and can carry out instructions stored on a memory 230, wherein the memory may include a read-only memory, a random access memory, a mass storage, a hard disk or the like. The memory 230 can furthermore include suitable program codes to be executed by the processing unit 220 so as to implement the above described functionalities of the wireless device. The wireless device can be a wireless device transmitting time-critical information and may be a machine type communications device which transmits time-critical and non-time-critical information. The wireless device can also be any other mobile entity or user equipment and it can be a telephone type of device, a cellular phone, a mobile station, a cordless phone or a personal digital assistant type of device like laptop, notebook, notepad, tablet equipped with a wireless data connection. The wireless device may be associated with non-humans like animals, plants or machines and may also be equipped with a subscriber identity module, SIM or similar module associated with a user using the wireless device. The presence of the SIM within the wireless device customizes the wireless device uniquely with a subscription of a user.

Figure 14:
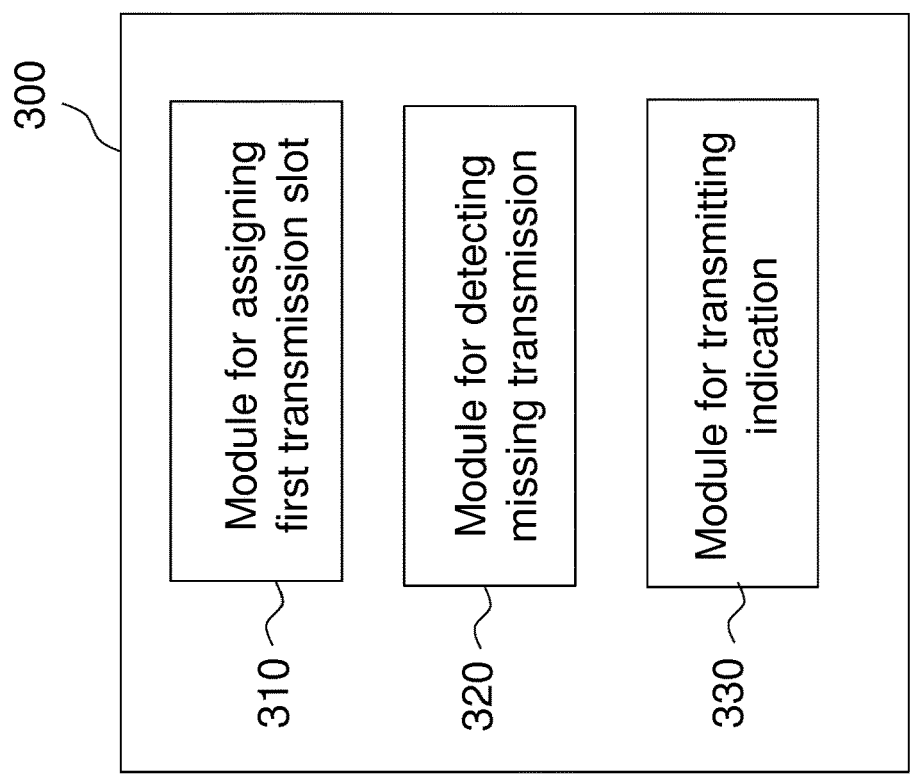
FIG. 14 shows another example schematic representation of the access point providing access to the wireless network which informs the wireless devices when a wireless device with priority access does not use the assigned time slot.

FIG. 14 shows a still further embodiment of the access point. The access point 300 of FIG. 14 comprises a first module 310 configured to assign a first transmission slot to one of the wireless devices which has a priority access to the assigned first transmission slot. A module 320 is provided within the access point 300 to detect that the wireless device having priority access to the first transmission slot is actually not transmitting data, or not transmitting data any more, in the assigned first transmission slot. A module 330 is provided which generates and transmits an indication to at least a sub-set of the other wireless devices that the corresponding transmission slot is available for contention-based transmission using a random access procedure.

Figure 15:
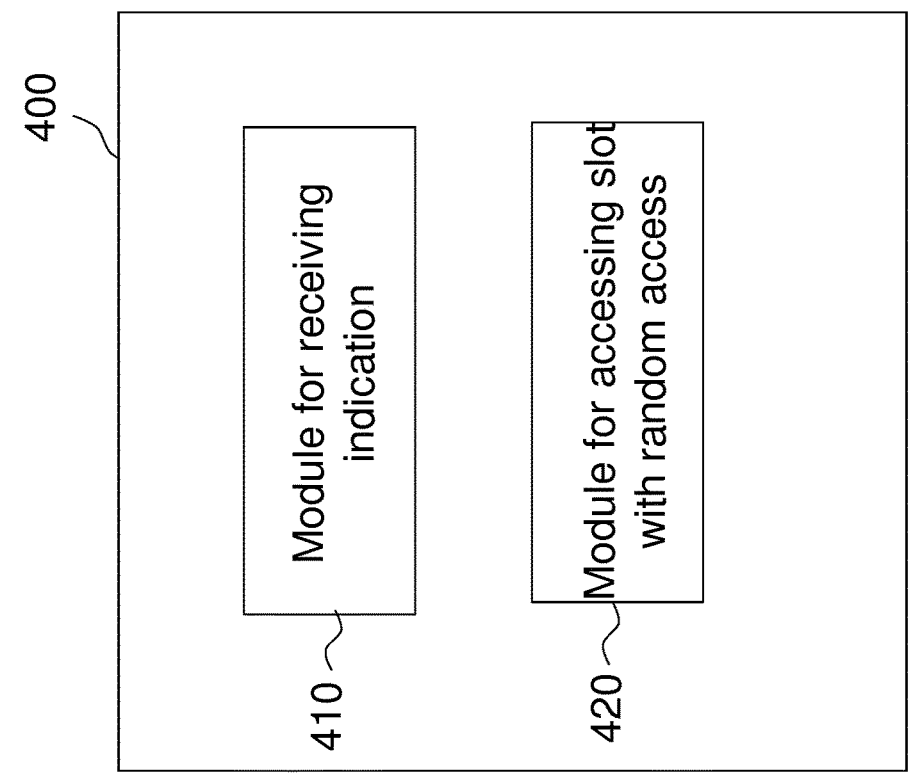
FIG. 15 shows another example schematic representation of a wireless device receiving the indication and which accesses a transmission slot based on the received indication.

FIG. 15 shows a further embodiment of one of the wireless devices receiving the indication transmitted by the access point. The wireless device 400 comprises a module 410 configured to receive the indication transmitted by the access point. The wireless device 400 is not the wireless device having priority access to the corresponding time slot referred to in the indication. The wireless device 400 furthermore comprises a module 420 which in response to the received indication then accesses the indicated time slot with a random access procedure.

From the above said some general conclusions can be drawn for the access point and the wireless device.

As far as the access point is concerned the access point transmits the indication to the wireless devices which indicates that the time range in the first transmission slot which was assigned to the first wireless device having priority access to the first transmission slot is available to all wireless devices for a data transmission using a contention-based access procedure.

The detecting step during the first transmission slot that the first wireless device which has priority access to the first transmission slot is currently not transmitting data can include detecting that the first wireless device does not transmit any data at all in the assigned first transmission slot. As discussed above in connection with FIG. 4, the indication 50 can be sent when no data is transmitted at all.

Furthermore, it is possible that it is detected during the first transmission slot that the first wireless device is currently not transmitting data means that it is detected that the first wireless device has already finished transmitting data in the assigned first transmission slot. This example was discussed above in connection with FIG. 5.

The at least one transmission channel 40 of the access point can comprise in the sequence of transmission slots scheduled transmission slots in which a scheduled transmission with a priority access is used for data transmission in a deterministic transmission mode. The transmission channel can also comprise additionally random access transmission slots in which a random access procedure is used for data transmission in a contention mode. The indication then can indicate that at least the time range until the end of the first transmission slot is available for transmission in the contention mode even though it was originally a scheduled transmission slot.

The detecting during the first transmission slot that the first wireless device is currently not transmitting data can comprise the step of determining for a predefined time range $T_{CD}$ that the first wireless device is not transmitting data in the first transmission slot.

The detection during the first transmission slot that the first wireless device is currently not transmitting data can also comprise the step of detecting an energy present in the first transmission slot, wherein, when the detected energy is lower than a defined energy threshold, it is determined that the first wireless device is currently not transmitting data.

The detecting step during the first transmission slot that the first wireless device is currently not transmitting data can also comprise the step of detecting a presence of a data packet in the first transmission slot, and when no data packet is detected in the first transmission slot, it is determined that the first wireless device is currently not transmitting data.

The detection of a presence of a data packet can comprise the step of detecting a correct decoding of a signal field present in the data packet. When a correct decoding of the signal field is not possible the access point determines that the first wireless device is not transmitting data in the first transmission slot.

The first transmission slot can be assigned to a single wireless device but also to group of wireless devices. The indication may be transmitted to at least the subset of the plurality of wireless devices when it is detected during the first transmission slot that none of the group of the wireless devices is transmitting data in the assigned first transmission slot.

Furthermore, as discussed in connection with FIG. 6, the indication 50 transmitted to at least the subset of the plurality of wireless devices can additionally indicate that at least one other future transmission slot 49 after the first transmission slot and assigned to the first wireless device or any other of the wireless devices for a scheduled transmission is available to the plurality of wireless devices for a data transmission using a random access procedure.

The transmitted indication can be sent as a broadcast message and can comprise a subset identifier allowing the subset of wireless devices to be identified among the plurality of wireless devices, if not all of the plurality of wireless devices, but only a subset thereof should be address by the indication. As an alternative it is unicast message only sent to the subset of devices.

The wireless network can be a wireless LAN network and the predefined time range may correspond to a priority interframe spacing, PIFS.

For transmitting the indication a contention-free end frame or an acknowledgement frame may be transmitted.

As far as the wireless devices are concerned the wireless device can start to access the transmission channel within the first transmission slot in response to the received indication in a contention-based manner. Accordingly, the wireless device can correctly interpret the received indication, the received contention-free end frame or the received acknowledgement frame within the first transmission slot and can react accordingly. When the wireless device receives a contention-free end frame or the acknowledgement frame the transmission slot is accessed using the random access procedure in response to the received frame.

The received indication can furthermore comprise information that at least one other future transmission slot after the first transmission slot and assigned to the first wireless device or any other of the wireless devices for a scheduled transmission with priority access is available for data transmission using a random access procedure. The wireless device which is not the wireless device having priority access can then access the transmission channel and the at least one other future transmission slot using a random access procedure in response to the received indication. The wireless device knows that even though it is not the wireless device to which the transmission slot was originally assigned with priority, that it can access the corresponding transmission slot with a random access procedure.

The above discussed solution has the following advantages:

It enables a more dynamic use of the wireless network in which critical and non-critical operation modes are used. The above-discussed solution especially enables that more time is spent in the non-critical mode while still enabling a full determinism for the time-critical traffic in the scheduled transmission slots. Furthermore, the provided solution has a low complexity and can be implemented easily.

The invention claimed is:

1. A method for operating an access point providing access to a wireless network for a plurality of wireless devices, wherein the wireless network comprises at least one transmission channel with a sequence of transmission slots, the method comprising:
  assigning a first transmission slot of the sequence of transmission slots to a first wireless device of the plurality of wireless devices for a scheduled transmission with a priority access to the first transmission slot for the first wireless device;
  determining during the first transmission slot that the first wireless device is currently not transmitting data in the assigned first transmission slot; and
  transmitting an indication to at least a subset of the plurality of wireless devices indicating that at least a time range in the first transmission slot until an end of the first transmission slot is available to the plurality of wireless devices for a data transmission using a random access procedure, wherein the indication transmitted to at least the subset of the plurality of wireless devices additionally indicates that at least one other future transmission slot after the first transmission slot and assigned for a scheduled transmission is available to at least the subset of the plurality of wireless devices for a data transmission using the random access procedure;
  wherein determining during the first transmission slot that the first wireless device is currently not transmitting data in the assigned first transmission slot is based on that a detected energy carried out by the access point is lower than a defined energy threshold for a predefined time range from an expected transmission start and further on that a presence of a data packet is not detected for a further predefined time range subsequent to the predefined time range.

2. The method according to claim 1, wherein detecting during the first transmission slot that the first wireless device is currently not transmitting data comprises detecting that the first wireless device does not transmit any data at all in the assigned first transmission slot.

3. The method according to claim 1, wherein detecting during the first transmission slot that the first wireless device is currently not transmitting data comprises detecting that the first wireless device has already finished transmitting data in the assigned first transmission slot.

4. The method according to claim 1, wherein the at least one transmission channel comprises in the sequence of transmission slots scheduled transmission slots in which a scheduled transmission with a priority access is used for data transmission in a deterministic transmission mode, and random access transmission slots, in which a random access procedure is used for data transmission in a contention mode, wherein the indication indicates that at least the time range until the end of the first transmission slot is available for transmission in the contention mode.

5. The method according to claim 1, wherein detecting during the first transmission slot that the first wireless device is currently not transmitting data comprises determining for a predefined time range, $T_{CD}$, that the first wireless device is not transmitting data in the first transmission slot.

6. The method according to claim 1, wherein detecting during the first transmission slot that the first wireless device is currently not transmitting data comprises detecting an energy present in the first transmission slot, wherein when the detected energy is lower than a defined energy threshold, it is determined that the first wireless device is currently not transmitting data.

7. The method according to claim 1, wherein detecting during the first transmission slot that the first wireless device is currently not transmitting data comprises detecting a presence of a data packet in the first transmission slot, wherein when no data packet is detected in the first transmission slot, it is determined that the first wireless device is currently not transmitting data.

8. The method according to claim 7, wherein detecting a presence of a data packet comprises detecting a correct decoding of a signal field present in the data packet, wherein when a correct decoding of the signal field is not possible, it is determined that the first wireless device is not transmitting data in the first transmission slot.

9. The method according to claim 1, wherein the first transmission slot is assigned to a group of first wireless devices, wherein the indication is transmitted to at least the subset of the plurality of wireless devices, when it is detected during the first transmission slot that none of the group of the wireless devices is transmitting data in the assigned first transmission slot.

10. The method according to claim 1, wherein transmitting the indication comprises transmitting at least one of a contention-free end frame and an acknowledgement frame.

11. The method according to claim 1, wherein the transmitted indication is a broadcast message and comprises a subset identifier allowing the subset of wireless devices to be identified among the plurality of wireless devices.

12. A method for operating a second wireless device of a plurality of wireless devices which accesses a transmission channel of a wireless network in which a first transmission slot of the transmission channel is assigned to a first of the plurality of wireless devices for a scheduled transmission with a priority access, the method comprising:
  determining during the first transmission slot that a first wireless device is currently not transmitting data in the assigned first transmission slot;
  receiving an indication from the access point of the wireless network during the first transmission slot that at least a time range in the first transmission slot until the end of the first transmission slot is available for a data transmission using a random access procedure; and
  starting to access the transmission channel within the first transmission slot using the random access procedure in response to the received indication, wherein the received indication comprises the information that at least one other future transmission slot after the first transmission slot and assigned to the first wireless device for a scheduled transmission is available for a data transmission using the random access procedure, wherein the transmission channel is accessed within the at least one other future transmission slot using the random access procedure in response to the received indication;
wherein determining during the first transmission slot that the first wireless device is currently not transmitting data in the assigned first transmission slot is based on that a detected energy carried out by the access point is lower than a defined energy threshold for a predefined time range from an expected transmission start and further on that a presence of a data packet is not detected for a further predefined time range subsequent to the predefined time range.

13. The method according to claim 12, wherein receiving an indication from an access point comprises receiving a contention-free end frame or an acknowledgement frame, wherein the transmission slot is accessed using the random access procedure in response to the received contention-free end frame or the received acknowledgment frame.

14. An access point configured to provide access to a wireless network for a plurality of wireless devices, wherein the wireless network comprises at least one transmission channel with a sequence of transmission slots, the access point comprising a memory and at least one processing unit, the memory containing instructions executable by said at least one processing unit, wherein the access point is operative to
    assign a first transmission slot of the sequence of transmission slots to a first wireless device of the plurality of wireless devices for a scheduled transmission with a priority access to the first transmission slot for the first wireless device,
    determine during the first transmission slot that the first wireless device is currently not transmitting data in the assigned first transmission slot,
    transmit an indication to at least a subset of the plurality of wireless devices indicating that at least a time range in the first transmission slot after transmitting the indication until the end of the first transmission slot is available to the plurality of wireless devices for a data transmission using a random access procedure,
    configure the indication such that the indication transmitted to at least the subset of the plurality of wireless devices additionally indicates that at least one other future transmission slot after the first transmission slot and assigned to the first wireless device for a scheduled transmission is available to at least the subset of the plurality of wireless devices for a data transmission using the random access procedure;
    wherein determine during the first transmission slot that the first wireless device is currently not transmitting data in the assigned first transmission slot is based on that a detected energy carried out by the access point is lower than a defined energy threshold for a predefined time range from an expected transmission start and further on that a presence of a data packet is not detected for a further predefined time range subsequent to the predefined time range.

15. The access point according to claim 14, wherein for detecting during the first transmission slot that the first wireless device is currently not transmitting data, the access point is operative to detect that the first wireless device does not transmit any data at all in the assigned first transmission slot.

16. The access point according to claim 14, wherein for detecting during the first transmission slot that the first wireless device is currently not transmitting data, the access point is operative to detect that the first wireless device has already finished transmitting data in the assigned first transmission slot.

17. The access point according to claim 14, wherein the at least one transmission channel comprises in the sequence of transmission slots scheduled transmission slots in which a scheduled transmission with a priority access is used for data transmission in a deterministic transmission mode, and random access transmission slots, in which a random access procedure is used for data transmission in a contention mode, wherein the indication indicates that at least the time range until the end of the first transmission slot is available for transmission in the contention mode.

18. The access point according to claim 14, wherein for detecting during the first transmission slot that the first wireless device is currently not transmitting data, the access point is operative to determine for a predefined time range, $T_{CD}$, that the first wireless device is not transmitting data in the first transmission slot.

19. The access point according to claim 18, wherein the wireless network is a Wireless LAN network and the predefined time range corresponds to a Priority Interframe Spacing, PIFS.

20. The access point according to claim 14, wherein for detecting during the first transmission slot that the first wireless device is currently not transmitting data, the access point is operative to detect an energy present in the first transmission slot, wherein when the detected energy is lower than a defined energy threshold, the access is operative to determine that the first wireless device is currently not transmitting data.

21. The access point according to claim 14, wherein for detecting during the first transmission slot that the first wireless device is currently not transmitting data, the access point is operative to detect a presence of a data packet in the first transmission slot, wherein when no data packet is detected in the first transmission slot, the access is operative to determine that the first wireless device is currently not transmitting data.

22. The access point according to claim 14, further being operative to assign the first transmission slot to a group of first wireless devices, and to transmit the indication to at least the subset of the plurality of wireless devices, when the access point detects during the first transmission slot that none of the group of the wireless devices is transmitting data in the assigned first transmission slot.

23. A second wireless device of a plurality of wireless devices which accesses a transmission channel of a wireless network in which a first transmission slot of the transmission channel is assigned to a first of the plurality of wireless devices for a scheduled transmission with a priority access, the second wireless device comprising a memory and at least one processing unit, the memory containing instructions executable by said at least one processing unit, wherein the second wireless device is operative to
    determine during the first transmission slot that a first wireless device is currently not transmitting data in the assigned first transmission slot,
    receive an indication from an access point of the wireless network during the first transmission slot that at least a time range in the first transmission slot until the end of the first transmission slot is available for a data transmission using a random access procedure, start to access the transmission channel within the first transmission slot using the random access procedure in response to the received indication, wherein the received indication comprises the information that at least one other future transmission slot after the first transmission slot and assigned to the first wireless device for a scheduled transmission is available for a data transmission using the random access procedure, the second wireless device being operative to access the transmission channel within the at least one other future transmission slot using the random access procedure in response to the received indication;

wherein determine during the first transmission slot that the first wireless device is currently not transmitting data in the assigned first transmission slot is based on that a detected energy carried out by the access point is lower than a defined energy threshold for a predefined time range from an expected transmission start and further on that a presence of a data packet is not detected for a further predefined time range subsequent to the predefined time range.

24. The second wireless device according to claim 23, wherein for receiving an indication from an access point the second wireless device is operative to receive a contention-free end frame or an acknowledgement frame, and to access the transmission slot using the random access procedure in response to the received contention-free end frame or the received acknowledgment frame.

25. A computer program product comprising:
   a non-transitory storage medium that stores computer program code to be executed by at least one processing unit of an access point, wherein execution of the computer program code causes the at least one processing unit of the access point to execute a method according to claim 1.

26. A computer program product comprising:
   a non-transitory storage medium that stores computer program code to be executed by at least one processing unit of a wireless device, wherein execution of the computer program code causes the at least one processing unit of the wireless device to execute a method according to claim 12.

* * * * *